United States Patent [19]

Mills

[11] 3,824,471

[45] July 16, 1974

[54] PCM TONE RECEIVER USING FLOATING-POINT DIGITAL SPECTRUM ANALYSIS

[75] Inventor: Jeffrey P. Mills, Forest Park, Ill.

[73] Assignee: GTE Automatic Laboratories Incorporated, Northlake, Ill.

[22] Filed: Dec. 1, 1972

[21] Appl. No.: 311,064

[52] U.S. Cl. ................. 325/321, 325/38 R, 178/68, 179/15 AP

[51] Int. Cl. ............................................ H04b 1/16

[58] Field of Search ............ 325/38 R, 38 A, 39, 40; 179/321, 15 R, 15 AP, 15 BY; 340/347; 332/11; 178/68

[56] References Cited

UNITED STATES PATENTS

| | | | |
|---|---|---|---|
| 3,423,534 | 1/1969 | Pan | 179/15 BY |
| 3,544,723 | 12/1970 | Battista | 179/15 BY |
| 3,549,814 | 12/1970 | Jaeger, Jr. | 179/15 BY |
| 3,710,028 | 1/1973 | Pitroda | 179/15 BY |

*Primary Examiner*—Benedict V. Safourek
*Assistant Examiner*—Jin F. Ng
*Attorney, Agent, or Firm*—J. V. Lapacek

[57] ABSTRACT

Method and apparatus for detecting one or more tone signals in a PCM signal corresponding to an original analog voltage, without converting the PCM signal to analog, including sequentially monitoring samples of the PCM signal using an expression, $V_f$, in Fourier spectrum analysis selectively for the respective tone signals to be detected, and storing and accumulating, in floating-point form, the magnitude of $V_f$, wherein the determined magnitude of the tone signal in the original analog signal. The accumulated magnitude is compared with another accumulated quantity, $V_r$, derived from the incoming PCM signal, to determine if the amplitude of the respective tone exceeds a certain percentage of that of the entire signal. This allows the detector to operate correctly under varying levels of the analog signal.

14 Claims, 3 Drawing Figures

PATENTED JUL 16 1974

3,824,471

SHEET 1 OF 3

PATENTED JUL 16 1974

3,824,471

SHEET 3 OF 3

PCM TONE RECEIVER USING FLOATING-POINT DIGITAL SPECTRUM ANALYSIS

This invention relates to signal detecting and in particular to apparatus and a method for detecting one or more audio frequencies (tones) contained in a Pulse-Coded Modulation (PCM) signal.

BACKGROUND OF THE INVENTION

Reference may be made to the following U.S. Pat. Nos.: 2,902,542; 3,432,619; 3,435,147; 3,544,723; 3,548,107 and 3,632,888.

Pulse-Coded Modulation (PCM) is a system of audio frequency transmission whereby the continuously varying (analog) audio signal is coded into a series of digital binary pulses, transmitted over a distance, and then converted back to analog. The signal, while in digital form, may be transmitted over very large distances. Any distortion or attenuation introduced by the transmission medium can be corrected for at strategic points ("repeaters") since the full amount of information can be recovered from the digital pulse-coded signal at each repeater. Furthermore, many audio signals can be combined onto one PMC line, and later separated, so that the line can transmit many conversations. This multiplexing is achieved by sequentially transmitting one pulse from each conversation onto the line, and, at the receiving end of the line, using a demultiplexer to divert each pulse to the correct converter, each of which then converts the pulses of one conversation back to the conventional analog form. The principle is described in various publications, and reference may be made for instance to "An Introduction to PCM Switching," Automatic Electric Technical Journal, April, 1971.

Control signal information, such as the number being called, etc., is conveyed over conventional telephone lines by audio-frequency tones, such as the Touch Calling Multifrequency (TCMF) and the Two-Out-of-Six Multifrequency (2/6 MF) schemes. In these schemes two audio frequencies are generated by oscillators and applied to the conventional telephone lines, and filters are used at the receiving end to detect the presence of these control signal tones and cause the system to operate accordingly.

Although many different schemes could be used to transmit the control signal information over PCM lines, it is desired, for compatibility reasons, to inject the same tones into the analog circuitry and code them, like any other audio signal, such as voice signals, into the PCM format. Then, at the receiving end, the demultiplexer could convert this pulse-coded tone back to analog, and the presence of the tones may be detected, as with conventional telephone lines, by filters, as set forth, for example, in U.S. Pat. No. 3,544,723. This patent also suggests the detection of a PCM tone signal by comparing an incoming signal to its delayed derivative, the detection being effected in the PCM domain.

Improved method and apparatus for detecting one or more tones in a PCM signal are disclosed in my copending application Ser. No. 258,799, filed June 1, 1972, and assigned to the same assignee here. That application uses digital Fourier spectrum analysis and describes one technique for implementation. It assumes an ideal logarithmic "compression" function, which is only approximately correct for some systems and therefore lead to a small error, tolerable in most instances.

Furthermore, the majority of the detecting operation is carried out using logarithms, which, in general, are transcendental numbers which can be only approximately represented by a finite number of bits. This is described in more detail in the article, "'Second Generation' Toll-Quality PCM Carrier Terminal," Automatic Electric Technical Journal, April, 1972.

SUMMARY OF THE INVENTION

In accordance with the principles of the present invention, a PCM tone signal is detected using logic circuits in a novel PCM receiver combination, without the necessity of converting the PCM signal to analog and then filtering it, without the necessity for deriving the derivative of the PCM signal, and without the inherent error caused by the approximation of the compression characteristic. The novel PCM receiver detector monitors consecutive codes on a PCM channel and employs digital Fourier spectrum analysis to detect the presence of a specific audio frequency in the PCM signal. The detector repeatedly samples the incoming PCM signal to determine the presence of each of six frequencies used for control, and, furthermore, evaluates and detects the relative strength of each such control or signalling frequency.

In the embodiment described hereinafter, means are provided such that the detecting operations are performed using true representations of the appropriate quantities, without the use of logarithms. Thus, the incoming signal is evaluated in its true form, rather than being considered as an approximation to an ideal logarithmic function. In accordance with this aspect of the invention, tone detection of a PCM signal is accomplished by a method and apparatus employing floating-point arithmetic operations. This type of arithmetic operation preserves a fixed degree of precision, regardless of the order of magnitude of the numbers being manipulated. Therefore, the detector of the present invention is as accurate at low signal levels as it is at high levels.

The apparatus required for the detection technique described herein is somewhat more complex than that described in my above mentioned application. Therefore, this technique is best suited for applications where the error introduced by the previously described technique, although small, is unacceptable. However, as more large scientific computers are produced, the component circuits may become readily available in large-scale monolithic forms. Then, the present invention may be preferable over that described in the aforementioned application even when the reduced error rate is not required.

In one embodiment of the invention, the magnitude of the Fourier spectrum analysis expression, $V_f$, for sequential samples of each tone to be detected in the PCM signal, is evaluated, stored, and accumulated in floating point form, the accumulated magnitude for each tone signal is proportional to the amplitude of the tone signal present in the analog signal, $V_a$, represented by the PCM signal. In the preferred embodiment of the invention concerning a system having a plurality of multiplexed PCM channels, there is provided an improved PCM tone receiver operable under varying analog signal levels with more efficient audio tone detection and having fewer sequential logic operations per PCM channel. In particular, a reference accumulator is provided for accumulating a quantity, $V_r$, proportional to the average strength of $V_a$, the analog signal corresponding to the incoming PCM signal. The contents of the two accumulators for each tone to be detected are then compared with the contents of the reference accumulator to detect the presence of a given tone, regardless of the average strength of the analog signal.

DETAILED DESCRIPTION

Figure 1:
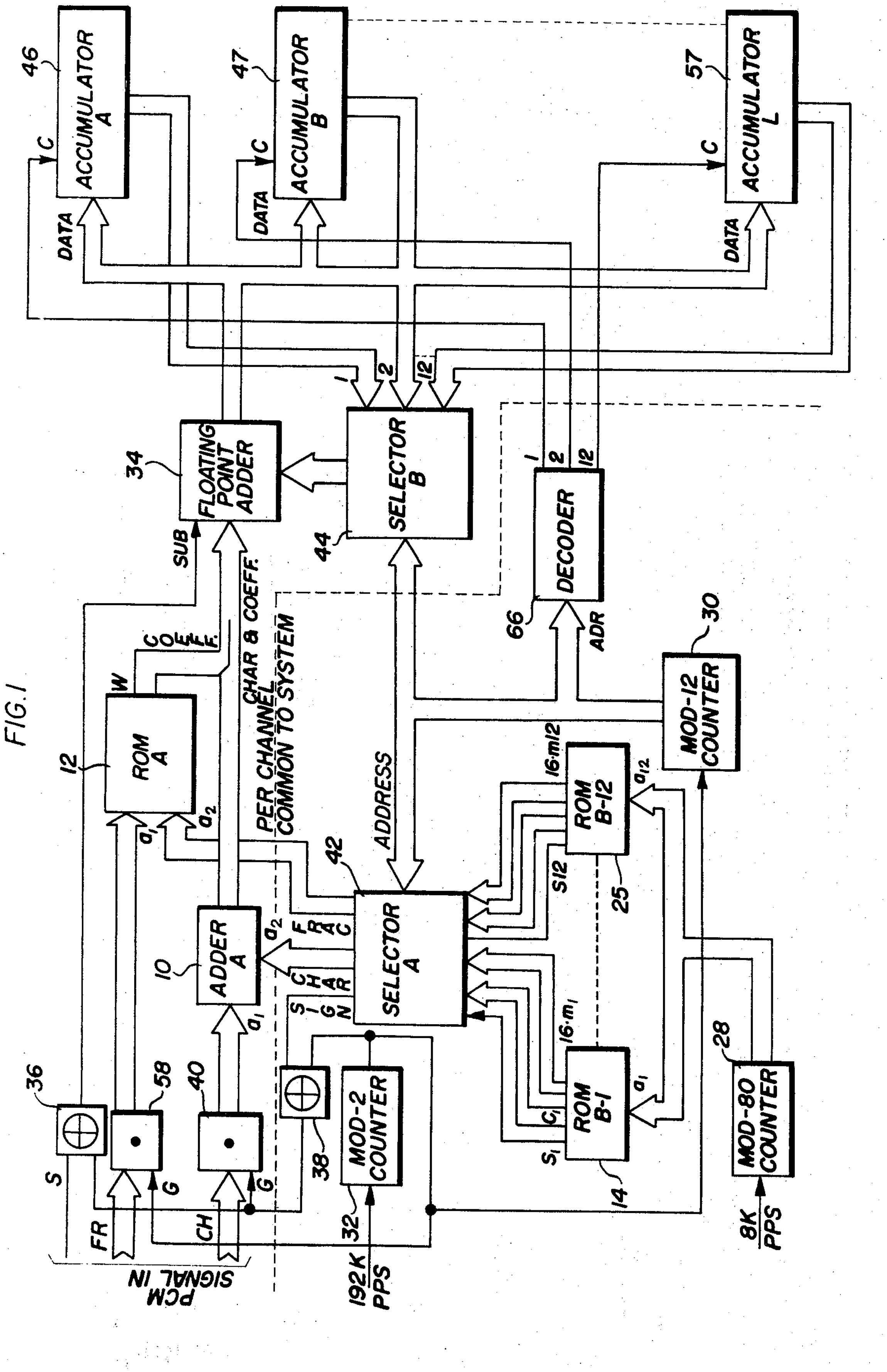
FIG. 1 illustrates one embodiment of the present invention for evaluating a PCM signal sample and storing and accumulating in floating point form a magnitude proportional to the amplitude of a tone signal present in the original analog signal.

As described in the aforementioned Automatic Electric Technical Journal publications, the analog signal such as voice or tone is nonlinearly coded into the PCM signal, in order to reduce quantizing noise. The ideal logarithmic relationship between $V_{out}$, the "compressed" voltage, and $V_{in}$, the original analog signal is:

$$|V_{out}| = V_{max} \log (1 + \mu |V_{in}/V_{max}|)/\log (1 + \mu);$$

and with the understanding that $V_{out}$ and $V_{in}$ have identical signs. With $\mu$ (the compression characteristic) equal to 255, this function yields a compressed code which is Efficiently Digitally Linearizable i.e., the compressed code can be converted to a linear code by digital means using binary logic as the phase is defined and set forth in the aforementioned article "'Second-Generation' Toll-Quality PCM Carrier Terminal," Automatic Electric Technical Journal, April, 1972. Therefore, it can be approximated using two numbers, "$c$" and "$m$," defined by the following relation:

$$1 + 255 \cdot |V_a| = (1 + m) \cdot 2^c$$

where $c$ is an integer and $m$ is a fraction between 0 and 1 ($0 \leq m < 1$), and where $V_a$ is the original analog signal (normalized so that its maximum value is 1, i.e., $V_a = V_{in}/V_{max}$). With these restrictions on $c$ and $m$, these two numbers are uniquely determined for a given value of $V_a$.

Since it has been assumed that $0 \leq V_a < 1$, it may be shown that $0 \leq c \leq 7$, and $c$ can be represented by three binary bits.

Furthermore, $m$ is a fraction between 0 and 1, and therefore has no integer bits but requires a multitude of fractional bits. If four such bits are retained, a reasonable approximation to $m$ is obtained. If $V_b$ is defined as follows:

$$V_b = S \cdot (c + m)/8$$

where $S$ is the sign of $V_a$ (either +1 or −1), then it may be shown that $V_b$ will be approximately equal to the "compressed" voltage specified in the ideal logarithmic expression, i.e., $V_b \approx V_{out}/V_{max}$. This approximation, rather than the true expression, is used in many PCM systems. A total of 8 bits are retained: one for the sign $S$, three for $c$, and four for $m$. The analog voltage may be recovered from this code by extracting $S$, $c$, and $m$ (which occupy separate bits) and using the following relation $$V_a = S \cdot [(1 + m) \cdot 2^c - 1]/255$$

The compressed code closely resembles a type of numerical representation known as floating-point binary representation. This type of numerical representation is used in most scientific digital computers, in order that they may handle large and small numbers with comparable precision. A more detailed description of floating-point representation, and its associated arithmetic operations, may be found in "Digital Computer System Principles," H. Hellerman, 1967, pp 310–314. Many circuits are known which arithmetically manipulate such floating-point numbers and which are used for this purpose in scientific and large general purpose computers. This application hereinafter describes one such circuit applicable to the problem started herein.

The known mathematical principle of Fourier spectrum analysis states that, with $V_f$ defined as follows:

$$V_f = \sum_{t=1}^{n} V_a \cdot (\cos 2\pi ft + j \sin 2\pi ft),$$

(where $J = \sqrt{-1}$, the imaginary number prefix) the quantity $V_f$ will be proportional to the amount of the frequency, $f$, which is contained in $V_a$. From the above it may be shown that $$V_f = \sum_{t=1}^{n} S \cdot \{[(1+m) \cdot 2^c - 1]/255\}(\cos 2\pi ft + j \sin 2\pi ft).$$

It is possible to uniquely define $S'$, $c'$, $m'$, $S''$, $c''$, and $m''$ such that $$\cos 2\pi ft = S' \cdot (1 + m')\, 2^{c'}$$

and $$\sin 2\pi ft = S'' \cdot (1 + m'')\, 2^{c''}$$

where $S'$ and $S''$ are either + 1 or − 1 (the signs of cos $2\pi$ ft and sin $2\pi ft$, respectively), $m'$ and $m''$ are fractions between 0 and 1 ($0 \leq m', m'' < 1$), and, in this case, $c'$ and $c''$ are negative integers between −8 and −1 ($-8 \leq c', c'' \leq -1$). With the above quantities thus defined, it may be shown that $$V_f = \frac{1}{255} \cdot \sum_{t=1}^{n} S \cdot \{S' \cdot [(1+m+m'+mm') \cdot 2^{c+c'} - (1+m') \cdot 2^{c'}] + jS''[(1+m+m''+mm'') \cdot 2^{c+c''} - (1+m'') \cdot 2^{c''}]\}$$

The above expression defines the steps which are executed in the process of floating-point multiplication.

The method and apparatus described in my aforementioned application detects tones in a PCM signal by adding logarithms, derives the antilogarithm of the result, and then adds this antilogarithm to an accumulator. The present invention, on the other hand, detects such tones by using floating-point arithmetic, with no logarithmic or antilogarithmic conversions necessary.

The quantities $S'$, $S''$, $c'$, $c''$, $m'$, and $m''$ are generated as reference quantities in the apparatus indicated as "common to the system." They are generated for each of the size frequencies, $f_1$ through $f_6$, and are sequentially applied to the PCM channel detector circuits. Therefore, each control tone or frequency will eventually be looked for.

Figure 2:
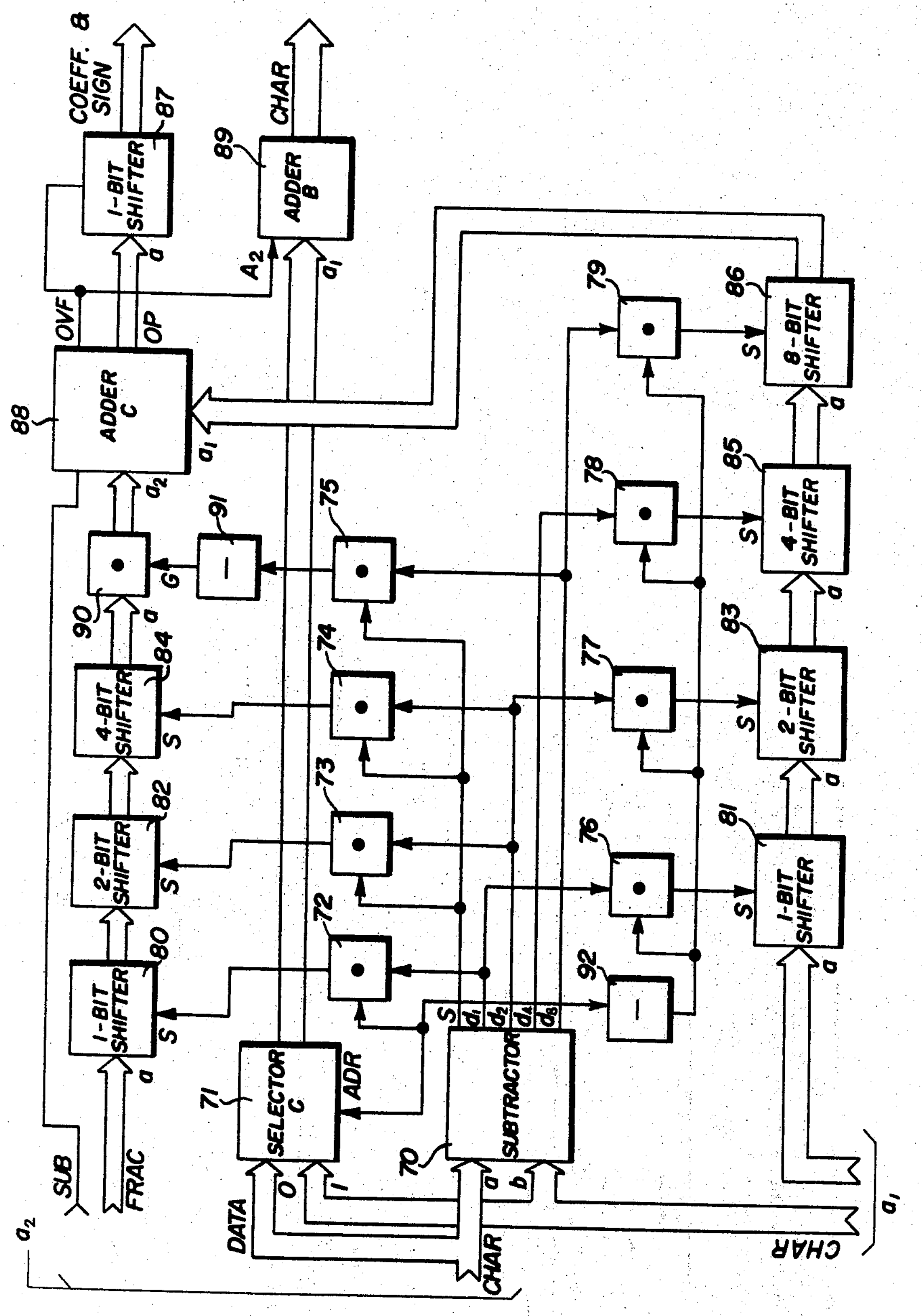
FIG. 2 illustrates a floating point arithmetic circuit diagram in accordance with the present invention.

It is to be understood that only one PCM channel is shown for illustrating the invention of FIGS. 1 and 2, whereas normally the "common" reference apparatus would be multiplexed to a plurality of PCM channels similar to that denoted as "per channel" apparatus in the illustration. The adders, the "AND" and "Exclusive-Or" circuits, the selector and decoder circuits, the Read-Only-Memory, and the accumulators are standard circuits which are described in computer-circuitry textbooks, publications, etc. and reference may be made for instance to: "The Integrated Circuits Catalog for Design Engineers," First Edition, published by Texas Instruments Incorporated, 1971; "Switching Theory," P. E. Wood, McGraw-Hill, 1968; "Finite-State Models for Logical Machines," F. C. Hennie, Wiley and Sons, 1968; "Digital Computer Design Fundamentals," Y. Chu, McGraw Hill, 1962; and "Digital Computer System Principles," H. Hellerman, McGraw Hill, 1967. As utilized herein, such circuits and their functions can be described as follows.

An adder 10, labeled "Adder A" in FIG. 1 is a three-bit adder. Its two inputs $a_1$ and $a_2$ are each three-bit binary numbers and its output is a four-bit binary number. They are related as: output $= a_1 + a_2$.

A memory unit 12, labeled "Rom A" (Read-Only Memory A) in FIG. 1 is a 256-word, six-bit memory, which is written once, at the time of manufacture. The contents of each word are such that $W = 16 \cdot (1 + a_1/16 + a_2/16 + a_1a_2/256)$ where $a_1$ is the four high-order bits of the address of the word, $a_2$ is the four low-order bits of the address, and W is the word itself. The memory 12 thus serves to generate the scaled coefficient ( $W$ ) in response to the address bits, $a_1$ and $a_2$. The value of each number, $a_1$ and $a_2$, ranges from 0 to 15.

Similarly, the 12 memory units 14 through 25, labeled "Read-Only Memories (ROM) B1 through B12" are 80-word, 8-bit memories. The first bit of each word is the "sign" bit ($s_n$), the second, third, and fourth bits comprise a three-bit binary number, the "characteristic" ($c_n$), and the remaining bits comprise a four-bit binary number, the scaled "fraction" ($16 \cdot m_n$). The contents of each word as related to its address "$a_n$" as follows:

$$c_n = [\log_2 |\cos (f_n \cdot a_n \cdot \pi/4{,}000)|]$$

$$m_n = |\cos (f_n \cdot a_n \cdot \pi/4{,}000)| \cdot 2^{-c_n-1}$$

$$s_n = \text{sign} (\cos (f_n \cdot a_n \cdot \pi/4{,}000))$$

and for even $n$:

$$c_n = [\log_2 |\sin (f_n \cdot a_n \cdot \pi/4{,}000)|]$$

$$m_n = |\sin (f_n \cdot a_n \cdot \pi/4{,}000)| \cdot 2^{-c_n-1}$$

$$s_n = \text{sign} (\sin (f_n \cdot a_n \cdot \pi/4{,}000))$$

where $$f_1 = f_2 = 700$$
$$f_3 = f_4 = 900$$
$$f_5 = f_6 = 1{,}100$$
$$f_7 = f_8 = 1{,}300$$
$$f_9 = f_{10} = 1{,}500$$
$$f_{11} = f_{12} = 1{,}700$$

where "$\log_2$" represents the logarithm to the base 2, and where "[ ]" represents the "greater integer" function, which is well-known.

Note that $c_n$ is always a negative number. It is represented in "two's complement" form, without its sign, since its sign is always understood to be negative. The memories 14–25 generate the above functions in a manner similar to memory unit 12. All Read-Only Memories 14–25 are standard logic circuits, specialized only by the contents of the words, which, for Read-Only Memories, are entered at the time of manufacture of either the memory itself or the system in which it is used.

The mod-80 binary counter 28 is a standard binary counter which resets itself at a count of 80. The mod-12 binary counter 30 and mod-2 binary counter 32, likewise, are binary counters which reset themselves at counts of 12 and 2, respectively. The mod-80 counter contents are incremented every 125 microseconds. The mod-12 counter 30 is driven by a 96,000 pps pulse signal provided through the mod-2 counter 32, and counter 30 thus is incremented 12 times for every increment of counter 28.

Each of the "Exclusive-Or" gates 36, 38 has two single-bit inputs and a single-bit output. Its output is a binary "0" when the two inputs are alike (1,1 or 0,0) and its output is "1" when the two inputs are different (1,0 or 0,1). This is also a standard logic circuit.

The "And" circuit 40 consists of three standard "And" gates, and its logic is such that if input G is a logic "1" then the three-bit output equals the three-bit input, whereas if input G is a logic "0," then the output is a binary "0" (all bits are "0"). Likewise, "And" circuit 58 consists of four standard "And" gates, and its input and output are each 4 bits. Its operation is identical to "And" circuit 40.

A selector 42 labeled "Selector A" contains 12 eight-bit data inputs and one eight-bit output, plus a four-bit address input. Its logic is such that its output is equal to the data at the data input specified by the binary number at the address input. When driven by the mod-12 counter, it causes the output of selector 42 to sequentially first assume the value on the input from memory unit 14 then the value on the input from memory unit 15, etc., until after twelve time intervals the output of selector 42 assumes the value on the input from memory unit 25. The selector 44 labeled "Selector B" is identical to selector 42 except that the data inputs and outputs are each 16 bits.

The storage units 46 through 57, labeled "Accumulators A through L" are each standard 16-bit registers. The logic of each register is such that when the C input is switched from "0" to "1" and back to "0," the 16-bit floating-point binary number appearing on the "data" input appears on its output and remains there until input C is switched again, even though the "data" input may vary meanwhile.

The decoder 66 is a standard logic circuit which causes a pulse to appear at the output designated by the binary number on its data input. When driven by the mod-12 counter, the result is that the 12 outputs, which are connected respectively to the C input lines of accumulators 46–57, are pulsed in sequence.

The floating-point adder unit 34 is a floating-point adder-subtractor, with the add-subtract function controlled by input "SUB." Input $a_1$ and the output are 16-bit floating-point binary numbers, each consisting of a four-bit characteristic, a sign bit, and an 11-bit coefficient. Input $a_2$ is a 10-bit floating-point binary number consisting of a four-bit characteristic and a six-bit coefficient. The coefficients are expressed in two's complement form if negative. The numbers are related such that, using the conventions for floating-point addition and subtraction, if SUB = 0 then output $= a_1 + a_2$ and if SUB = 1 then output $= a_1 - a_2$ This process may be achieved by any of the conventional floating-point arithmetic circuits currently available, as for instance in digital computers. One such circuit is shown in FIG. 2, and is described as follows.

Subtractor 70 is a four-bit subtractor. Its outputs are defined as follows:

$$S = 0 \text{ if } a \geq b$$

$$S = 1 \text{ if } a < b$$

$$8 \cdot d_8 + 4 \cdot d_4 + 2 \cdot d_2 + d_1 = |a - b|$$

where all output are one-bit binary numbers. The outputs thus represent a five-bit positive or negative binary number in signed magnitude form. This is also a standard logic circuit as used for instance in digital computers.

Selector 71 (Selector C) is identical to Selector 42 of FIG. 1 except that its data inputs and output are each only four bits, it contains only two data inputs, and the address input therefore requires only one-bit. When the address input is "0," the data on input 0 is routed through to the output, and vice versa. "And" gates 72 through 79 are standard logic circuits wherein an output is "1" if and only if both inputs are "1." "And" circuit 90 is identical to "And" circuit 40, FIG. 1, except that its data input and output are each 5 bits. "Not" gates 91 and 92 are also standard logic circuits wherein an output is "1" if and only if the input is "0."

Adder 89, labeled Adder B, is identical to Adder 10 of FIG. 1 except that input $a_2$ is only one-bit.

The adder unit 88 labeled "Adder C" is an adder-subtractor, with the add-subtract function controlled by input "SUB." Input $a_1$ and the output are 12-bit binary numbers, input $a_2$ is a six-bit binary number. The numbers are related such that:

if SUB = 0 then output $= a_1 + a_2$ and if SUB = 1 then output $= a_1 - a_2$ and

*ovf* = 1 in case of overflow.

A negative number is expressed in signed two's-complement form.

This is also a standard logic circuit.

Shifter circuits 80 through 87 are described as follows. Input a and the output are binary numbers. The number of bits in each output equals the number of bits in the corresponding input *a;* this number, *n*, is 6 for circuits 80, 82, and 84, and 12 for all other circuits. The amount of shift, *m*, is one for circuits 80, 81, and 87 two for circuits 82 and 93, four for circuits 84 and 85, and eight for circuit 86. If $a_i$ and $o_i$ represent one input bit and one output bit, respectively ($1 \leq i \leq n$), where bit 1 is the left-most bit and bit *n* is the right-most, the logic of all shifter circuits is as follows, substituting appropriate numbers for *m* and *n* as specified above:

For $1 \leq i \leq m$:

$o_i = \bar{s} \cdot a_i + s \cdot \bar{a}_1$ for shifter 87 ($m = 1$)

$o_i = \bar{s} \cdot a_i + s \cdot a_1$ for other shifters

For $m < i \leq n$:

$o_i = \bar{s} \cdot a_i + s \cdot a_{i-m}$ for all shifters where "·" and "+" represent Boolean "And" and "Or," not multiplication or addition. The result is that, if input s is "1," the output is equal to input "*a*" shifted "*m*" bits to the right, with the sign bit, $a_1$, copied into bits $o_1$ through $o_m$. The shifting algorithm is well known, see for example, Digital Computer Design Principles by Yaohan Chu, p. 12. Shifter 87 provides a special function; namely, it replaces a bit lost due to overflow; therefore, this shifter shifts the opposite of the sign bit into bit $o_1$. If input *s* of any shifter is "*o*," its output is equal to input "*a*" with no shift or other change whatsoever.

The operation of the PCM tone detector shown in FIGS. 1 and 2 is as follows. The output of the mod-2 counter 32 is initially at 1; the outputs of the mod-12 counter 30 and the mod-80 counter 28 are at 0. A sample of the PCM code, equal to 128 $V_b$, is present at the input to the tone detector (PCM signal in). The characteristic of this sample, *c*, passes through the "And" circuit 40 and is added by adder 10 (Adder A) to *c'*, the "characteristic" output of memory unit 14 (ROM B1) which is, at that time, being routed through selector 42. The output of Adder A is therefore equal to $c + c'$. Simultaneously, the fraction of the current sample, 16 *m*, passes through the "And" circuit 58 and is applied to input $a_1$ of memory unit 12 (ROM A). The "fraction" output, 16 *m'*, of memory unit 14 (ROM B1) is, at that time, being routed through selector 42 and is being applied to input $a_2$ of memory unit 12 (ROM A). The output of the latter is therefore $16 \cdot (1 + m + m' + mm')$.

The outputs of adder 10 and memory unit 12 represent, respectively, the characteristic and the coefficient of the following floating-point number:

$$(1 + m + m' + mm') \cdot 2^{c+c'}$$

This floating-point number, which is always positive, is added to or subtracted from data in storage 46 (Accumulator A) by floating-point adder 34, depending on the sign of $V_b$ and the sign being read out of memory (ROM B1). Operation of floating-point adder 34 is as follows. The entire circuit is combinational; i.e., the floating-point sum or difference appears at its output as soon as the two numbers are applied at the inputs, except for gate delays.

The binary output of subtractor 70 is equal to the difference of the two characteristics. Case 1 occurs when the characteristic of $a_2$ is greater than or equal to the characteristic of $a_1$. Then $s = 0$ and the outputs of "And" gates 72, 73, 74, and 75 are "0" and no shifting occurs in shifters 80, 82, 84.

The coefficient of $a_2$ therefore appears at the output of shifter 84 unshifted, having been propagated through shifter circuits 80, 82, 84. The coefficient $a_2$ is propagated through "And" circuit 90 to input $a_2$ of adder 88. The address input of selector 71 is also "0," and therefore its output is equal to the characteristic of $a_2$, which is being applied to input 0. This output is applied to input $a_1$ and adder 89.

The magnitude of the difference of the characteristics is represented, in binary format, by the four outputs $d_1$, $d_2$, $d_4$ and $d_8$ of subtractor 70. Since output $s$ is "0," the output of "Not" gate 92 is "1." Therefore, the $s$ inputs of shifters 81, 83, 95, and 86 will be equal to the outputs $d_1$, $d_2$, $d_4$, and $d_8$, respectively, of subtractor 70. The coefficient of $a_1$ is applied to shifter 81, which will shift it one bit if $d_1 = 1$. The result is applied to shifter 83 which in turn will shift it two more bits if $d_2 = 1$, and so forth. The total number of shifted positions will be equal to the binary number represented by $d_1$, $d_2$, $d_4$, and $d_8$, which is equal to the difference of the two characteristics. The shifted coefficient is then in the correct position to be applied to input $a_1$ of adder 88.

The output of adder 88 is the sum of the coefficient $a_2$ and the shifted coefficient $a_1$ if SUB = 0, or their difference if SUB = 1. According to the floating-point addition-subtraction algorithm, this sum or difference will represent the coefficient of the floating-point sum or difference.

Case 2 occurs when the characteristic of $a_1$ is greater than the characteristic of $a_2$. Then $S = 1$ and the output of selector 71 is equal to the characteristic $a_1$ which is being applied to input $a_1$. The coefficient of $a_2$ is shifted by an amount equal to the difference between $a_1$ and $a_2$ in the same manner as the coefficient of $a_1$ was shifted in case one. In particular, if this difference is greater than seven, $d_8$ will be "1," the output of "And" gate 75 will be "1," and the output of "And" circuit 90 will be a binary "0." This corresponds to shifting the coefficient of $a_2$ completely off of input $a_2$ of adder 88, which occurs whenever the difference exceeds five. The output of adder 88 is, as with case one, the coefficient of the sum or difference of $a_1$ and $a_2$.

When the addition or subtraction within adder 88 causes an overflow, i.e., when the sum or difference would require 13 bits, output ovf is "1." The coefficient of the sum or difference is shifted one-bit to the right by shifter 87, which also shifts the lost bit back into the coefficient, as previously described. Adder 89 adds 1 to the characteristic to correct for this shift. On the other hand, if no overflow occurred, the coefficient and characteristic appear at the outputs of shifter 87 and adder 89, respectively, with no change. The output is, in all cases, the floating-point representation of the sum or difference of $a_1$ and $a_2$, which is placed in storage 46 (Accumulator A).

Next, the output of the mod-2 counter 32 changes to "0," the characteristic of $V_b$ is removed from the input of adder 10 (Adder A), and the fraction of $V_b$ is removed from input $a_1$ of memory unit 12 (ROM A). The outputs of adder 10 and memory unit 12 now display an exact duplicate of the output of memory 14 (ROM B1). Floating-point adder 34 now subtracts this floating-point number from storage 46 (Accumulator A) coupled through selector 44, or adds it if the previous operation was subtract. The net change in the floating-point number represents by the contents of storage 46 (Accumulator A) is:

$$(1 + m + m' + mm') \cdot 2^{c+c'} - (1 + m') \cdot 2^{c'}$$

The mod-12 counter then advances from 0 to 1 and the process is repeated for the other 11 storage units using the same PCM sample $V_b$. The mod-80 counter 28 then advances, changing the outputs of memory units 14–25 (ROM B1–B12), and the entire process is repeated on all 12 accumulators for all 80 samples.

The result of the operation of the circuit is that the real part and the imaginary part of each $V_f$, namely $V_{f1}$ through $V_{f8}$, will be totaled in floating-point form in the appropriate storage units 46–57 (Accumulators A through L). The accumulators which contain substantial totals at the end of a certain time interval (chosen to be 10 milliseconds) will therefore respectively contain data which represents the control tones present in the original $V_a$, as required. Well known apparatus can then read out the data representing the control tones, and the control circuitry of the switching system then interprets the meaning of these tones accordingly.

The numbers 255 and 256 appearing in the above formulas were based on industry standards and could be changed to accommodate other standards. Also, the 10 millisecond interval stated previously for sampling and filling storage units 46–57 is a compromise of low error rate versus speed of operation and the required accuracy of the generated tones. This interval could be changed if the relative importance of these factors changes. To improve the error rate even further, more precision (more bits) could be used to represent the various digital quantities.

Figure 3:
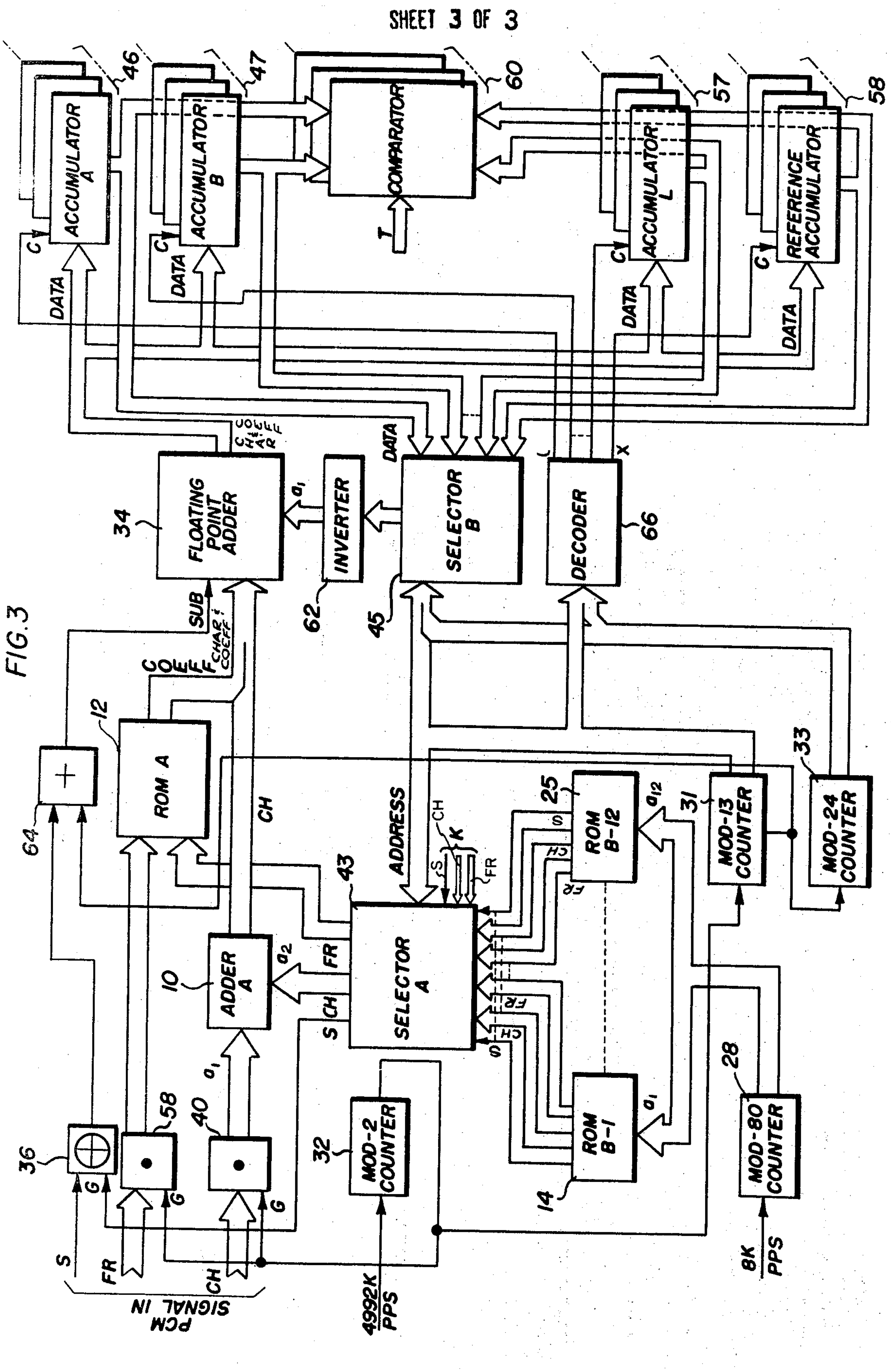
FIG. 3 illustrates an improved PCM tone receiver and the preferred embodiment of the present invention.

FIG. 3 illustrates an alternative preferred embodiment of an improved PCM tone received incorporating the principles of this invention. Much, but not all, of the standard logic circuitry of the embodiment shown in FIG. 3 is the same as that employed with the previously described apparatus shown in FIGS. 1 and 2. Among these identical circuits are a three-bit adder 10 designated "Adder A," and a 256-word, six-bit Read Only Memory 12 designated "ROM-A" written at the time of its manufacture with the contents of each word being the same as previously noted.

Similarly, twelve Read Only Memory units 14–25 designated ROM-B1 through ROM-B12 are 80-word, eight-bit memories. The first bit of each word is the "sign" bit ($S_n$) and the remainder comprise a seven-bit binary number, the "magnitude" ($M_n$). The contents of each word are related to its address "$a_n$38 as previously described for FIGS. 1 and 2.

The mod-80 binary counter 28 is a conventional binary counter which resets itself of a count of 80 and is driven by an 8,000 pps signal such that its contents are incremented each 125 microseconds. The mod-2 counter 32 is likewise conventional resetting itself at a count of 2, and is driven by a 4,992,000 pps signal. Mod-13 counter 31 resets itself at a count of 13, and when driven by a 2,496,000 pps signal from the mod-2 counter 32 is incremented 312 times for each increment of counter 28. Mod-24 counter 33 resets itself at a count of 24 and when driven by a 192,000 pps signal from the "13" output of counter 31 is incremented 24 times for each increment of counter 28.

The "exclusive-OR" gate 36 and the "AND" circuit 40 are the same as in FIGS. 1 and 2.

Selector circuit 43 designated "Selector A" is provided with 13 eight-bit data inputs, a four-bit address input, and an eight-bit data output. The logic of selector 43 is such that its output is equal to the data at the data input whose number corresponds to the number applied to the address input. When driven by the mod-13 counter 31 the eight-bit data output of selector 43 sequentially first assumes the value on the input from memory unit 14 then the value on the input from memory unit 15, etc., until after twelve time intervals the output of selector 43 assumes the value on the input from memory unit 25. During the thirteenth time interval the output of selector 43 assumes the constant value, K, which is hard-wired into the thirteenth input. The selector circuit 45 designated "Selector B" is basically similar to selector 43 in operation, however, it has 312 data inputs and one data output, each are of 16 bits, and the address input is 9 bits. Four of its address bits are provided by MOD-13 counter 31, and the remaining five are provided by Mod-24 counter 33.

Adder unit 34, is a floating-point adder-subtractor, with the add-subtract function controlled by input "SUB." The ten-bit data input, $a_2$, is thus either added to or subtracted from the sixteen-bit data output, $a_1$, of selector 45, after the latter is inverted by inverter circuit 62. The output of adder 34 is thus also a sixteen-bit binary number. The "SUB" input will be either a logic "1" or "0" depending upon the states of the inputs to "OR" gate 64 which are the count-thirteen output from the mod-13 counter 31 and the output from "exclusive-OR" gate 36. The inputs to adder 34 are such that:

if SUB = 0 then output $= a_1 + a_2$ and if SUB = 1 then output $= a_1 - a_2$.

The storage units 46 through 57 designated "Accumulator A-L," as well as reference accumulator 58, are each standard sixteen-bit registers and are duplicated for each PCM channel at the input of the receiver. Two accumulators, one each for the real and imaginary portions of each tone to be detected, are used. Thus in the typical PCM telephone switching system assumed here, which includes 24 PCM channels on which six multifrequency tones are to be detected, there will be 288 such accumulators used. The reference accumulator 58 will also be duplicated for each channel thus making a total of 312 accumulators in all.

The logic of each of these accumulators is such that when the C input is switched from "0" to "1" and back to "0," the sixteen-bit floating-point binary number present at the data input appears at the data output and remains there until input, C, is again switched. Although the data input may vary between switching of input, C, the data output remains constant.

The C input to each accumulator is provided by a standard decoder circuit 66 which causes a pulse to appear at the output designated by the binary number on its data input. When driven by the mod-13 and mod-24 counters 31 and 33 in the same manner as selector 45, the outputs 1 through $x$, which are coupled respectively to the C-inputs of the accumulators 46–58, each duplicated 24 times, are pulsed in sequence.

The data output of each accumulator 46–57 is coupled to a comparator circuit 60 which operates to compare the data output of each accumulator with that of the reference accumulator 58 for the same channel. Additionally, a constant reference value, $T$, may be coupled to the comparator 60 to provide data output corresponding to a preselected minimum signal strength below which it is desired to reject any tone signals.

The basic differences between the alternative preferred embodiment shown in FIG. 3 and that described in connection with FIGS. 1 and 2 are the duplication of accumulators 46 through 57 for each of the 24 PCM channels, the addition of a counter 33 to count the PCM channels, the addition of reference accumulator 58 and the comparator 60 for each PCM channel, the addition of inverter circuit 62 between selector 45 and adder 34, the use of a counter 31, a decoder 66, and selectors 43 and 45 having capacities increased to accommodate the additional reference accumulators 58 and duplicated accumulators 46 and 57, and the deletion of an "exclusive-OR" gate (38) from the "sign"-bit output of previous selector 42 (FIG. 1). The improved efficiency of operation provided by this embodiment of the present invention will become more apparent from the description of its operation.

Initially the output of the mod-2 counter 32 is at 1 and the outputs of the mod-80, and mod-13 and mod-24 counters 28, 31 and 33, respectively, are at zero. A sample of the PCM signal of the first channel, equal to 128 $V_b$ ($V_b$ being the compressed voltage) is presented at the input of the tone receiver. The three-bit binary number representing the characteristic of the sample passes through "AND" circuit 40 to one input of adder 10. The eighth bit of the same represents the sign of the sample and is coupled to one input of "exclusive-OR" gate 36. The sample characteristic is added to the "characteristic" output of memory 14 which is routed through selector 43. The output of adder 10 is therefore: $c + c'$.

The output of "And" circuit 58 is at that time being applied to memory unit 12 and coincides with the "fraction" output, 16 · m' applied to input $a_2$ of memory 12, so that the output thereof is $16 \cdot (1 + m + m' + mm')$. The outputs of adder 10 and memory unit 12 represent, respectively, the characteristic and the coefficient of the following floating-point number:

$$(1 + m + m' + mm') \cdot 2^{c+c'}$$

This floating-point number (call it A), which is always positive, is added to or subtracted from the data, $a_1$, stored in accumulator 46 by adder 34. The data output of accumulator 46 passes through selector 45 and its coefficient is inverted by inverter circuit 62 prior to being coupled to the input of floating-point adder 34. As stated hereinabove the add-subtract function of adder 34 depends upon the sign of the incoming compressed voltage, $V_b$, and the sign being read from memory 14. After the addition or subtraction the output of adder 34 is stored in accumulator 46.

Next the output of the mod-2 counter 32 advances to "0," and the quantity, $V_b$, is removed both from the input of adder 10 and memory unit 12 such that the outputs thereof becomes the exact duplicate of the respective characteristic and fraction outputs from memory 14. The $a_z$ of adder 34 is now:

$(1 + m') \cdot 2c'$ Adder 34 adds this quantity (call it B) to the inverted quantity just previously stored in accumulator 46 (or subtracts if the previous operation was a subtraction).

By employing an inverter circuit 62 between selector 45 and floating-point adder 34, which inverts the coefficient bits only, it has been found by the Applicant that the receiver circuitry may be substantially simplified by the elimination of an "exclusive OR" gate (38) between the sign output of selector 42 and the input of "exclusive-OR" gate 36. Assuming that the output of memory 12 is equal to either A or B as defined above, and assuming that the output of accumulator 46 equals S, then the floating-point adder 34 must perform the following function if inverter 62 is not used:

$$(S) + (A) = S + A \text{ (addition)}$$

$$(S + A) - (B) = S + A - B \text{ (subtraction)}$$

This requires one addition and one subtraction. Through the use of the inverter 62 it is possible to reach the same result while keeping both operations identical, i.e., addition or subtractions. Thus it is unnecessary that the SUB input to adder 34 be switched during the procession of each sample. Specifically the functions performed by the inverter 62 and adder 34 are:

$$S \cdot (-1) = -S \text{ (Inversion)}$$

$$(-S) - (a) = -S - A \text{ (Subtraction)}$$

$$(-S - A) \cdot (-1) = S + A \text{ (Inversion)}$$

$$(S + A) - (B) = S + A - B \text{ (Subtraction)}$$

Note that, since the coefficient of a negative number is expressed in two-*s*-complement form, inverting the coefficent bits is equivalent to changing the sign of the number.

Although this process may at first appear more complex than that used without the inverter 62 it permits the deletion of relatively complex "exclusive-OR" circuitry from the sign output of previous selector 42 (FIG. 1) and permits the direct coupling of this sign output to one input of "exclusive-OR" gate 36. The inverter, on the other hand, is a simple circuit and may even be made a part of selector 45.

The net change in the contents of accumulator 46 as a result of the two subtractions is thus A-B, or:

$$(1 + m + m' + mm') \cdot 2^{c+c'} - (l + m') \cdot 2^{c'}$$

If the two operations has been additions, the net change would instead be the negative of the above expression.

The mod-13 counter then advances from 0 to 1 and the process is repeated for the other eleven accumulators 47–57 using the same PCM sample, $V_b$.

When the mod-13 counter reaches a count of thirteen an output pulse is coupled to the second input of "OR" gate 64. This pulse forces the sign signal to "1" and the output of "AND" circuit 40 thus represents the absolute value of the incoming signal magnitude, $|V_b|$ 09. The output of selector 43 is the constant value, K, which is hard-wired to the thirteenth input of selector 43. The first bit of this number is the positive "sign" bit, the second, third, and fourth bits comprise the three-bit "characteristic," $c_k$, and the remaining bits comprise the four-bit "fraction," $16 \cdot mk$. Therefore, $K = (1 + m_k) \cdot 2^{c_k}$. These quantities are processed in the same manner as the outputs of the memories 14–25, and the result is stored in the reference accumulator 58. The net change in the contents of the reference accumulator is thus:

$$(1 + m + m_k + mm_k) \cdot 2^{c+c_k} - (1 + m_k) \cdot 2^{c_k};$$

or $$(1 + m_k) \cdot 2^{c_k} \cdot [(1 + m) \cdot 2^c - 1];$$

or $$K \cdot 255 \cdot |V_a|$$

The mod-24 counter 33 then advances changing the address applied to selector 45 and decoder 66 and simultaneously a sample from the next channel appears at "PCM SIGNAL IN," and the process is repeated for that channel, and so on, each channel using a different set of accumulators 46 through 58.

The mod-80 counter 28 then advances, changing the outputs of memory units 14–25, and the entire process is repeated on each of the accumulators for all 80 samples on all 24 channels.

At the completion of the operation, a quantity proportional to the real part and the imaginary part of each audio tone, $V_f$, specifically $255 \cdot V_{f_1}$ through $255 \cdot V_{f_6}$, for each channel, will be totaled in the appropriate accumulators 46–57 (duplicated for each channel). The reference accumulator 58 (also duplicated for each channel) will contain the quantity $225 \cdot V_r$, where:

$$V_r = \frac{1}{255} \sum_{t=1}^{n} K \cdot 255 \cdot |V_a| = K \sum_{t=1}^{n} |V_a|$$

representing the average strength of the analog signal $|V_a|$, coded into each PCM channel, i.e., proportional to the amplitude of the audio but independent of frequency. The constant of proportionality is the number, *K*. The accumulators 46–58 will thus contain substantial totals at the end of eighty samples, or a time interval of 10 milliseconds. Accumulators 46–57 will contain data which represents the control tones present in the original analog voltage and the reference accumulator will contain data which represents the strength of the audio signal.

At the end of the monitoring interval the contents of the accumulators for the real part and the imaginary part of each audio tone are coupled to a conventional comparison circuit, i.e., comparator 60, the logic of which is arranged such that an output logic signal representing the presence of a given one of the audio tones in a certain channel will be produced only if the absolute value of the accumulated floating-point total representing the real part or the imaginary part (or both) of that tone exceeds the floating-point quantity stored in the reference accumulator 58. The number *K* was chosen to achieve the desired threshold of detection; a typical value is 0.17. If both the accumulated magnitudes are less than the quantity stored in the reference accumulator for the same channel, the audio tone will be deemed not present in the incoming signal and the appropriate logic signal will be produced at that output of the comparison circuit 60.

While the use of a reference accumulator 58 and comparison circuit 60 would, in theory, be unnecessary if the analog signal $V_a$ were of a fixed level, this condition may not be relied upon in many practical systems. Through their use, however, the amplitude of each tone may be compared to that of the entire signal rather than to a fixed reference level and therefore the tone receiver may be made responsive to a wide dynamic range of input signal amplitudes, the error rate thereby being substantially reduced. In some applications it may be desired to reject very weak tones even though they exceed the specified percentage of the signal strength. Such tones may arise through crosstalk between analog signals before application to the PCM channels. In such cases a constant "T" may also be hard-wired to the comparison circuit 60 such that the accumulator contents for each frequency must exceed both the constant "T" and the contents of the reference accumulator before a signal representing a valid audio tone is produced. A typical value for "T" is 113, expressed as a floating-point number.

By duplicating the accumulators 46–58 for each 14–25 and the constant input, $K$, are scanned once for each channel during the 125 microsecond sample period; i.e., there is one scan for each of the duplicated accumulators and the 125/24 microsecond input sample period is compatible without the use of a signal demultiplexer at the input of the tone receiver. Therefore, in 24 scans there is one processed sample for each channel added to each of the 13 accumulators associated with each of the channels. It will be noted that with this approach, although the accumulators are duplicated for each channel, the remainder of the per-channel circuitry need not be duplicated.

Heretofore, it has been assumed that the memories 14–25 and the constant, $K$, as well as accumulators 46–58 are serially accessed. It will be understood, however, that if reduction of the number of sequential operations should be more significant than duplication of circuitry, parallel accessing may easily be provided by duplicating the common-to-system circuits for a plurality of memory-accumulator combinations.

From the foregoing it will be seen that the Applicant has provided improvements in PCM tone receivers whereby the objectives set forth hereinabove are efficiently attained. Certain changes will occur to those skilled in the art without departure from the scope of the invention. For example, Read-Only-Memories 14–25 together with selector 43 may be realized as a single large memory with an eleven-bit address input. A similar observation is possible for accumulators 46–58, selector 45, decoder 66 and inverter 62. It is therefore intended that all matter set forth in the description or shown in the appended drawings shall be interpreted as illustrative and not in any limiting sense.

What is claimed is:

1. In a signal detector the method of detecting at least one tone, $f_1$, from a PCM signal corresponding to an original analog signal, $V_a$, comprising the steps of:

sequentially providing one of a plurality of samples of said PCM signal during a discrete time interval from $t = 1$ to $t = n$;

automatically evaluating said sequential samples of said PCM signal during said time interval using the expression:

$$V_f = \frac{1}{255} \cdot \sum_{t=1}^{n} S \cdot \{S' \cdot [(1+m+m'+mm') \cdot 2^{c+c'} - (1+m') \cdot 2^{c'}] + jS''[(1+m+m''+mm'') \cdot 2^{c+c''} - (1+m'') \cdot 2^{c''}]\}$$

where $S$ is the sign of $V_a$;

$S'$ is the sign of $\cos 2\pi ft$;

$S''$ is the sign of $\sin 2\pi ft$;

$m$, $m'$ and $m''$ are fractions, and $c$, $c'$ and $c''$ are integers, such that $1 + 255 \cdot |V_a| = (1+m) \cdot 2^c$ $\cos 2\pi ft = S' \cdot (1 + m')\ 2\ c'$, and $\sin 2\pi ft = S'' \cdot (1 + m'')\ 2\ c''$, including the steps of providing reference quantities $S'$, $S''$, $c'$, $c''$, $m'$ and $m''$ corresponding to said tone signal, $f_1$;

sequentially determining with said reference quantities the magnitude and sign of the real part of said expression, $V_f$, (Real $V_f$) for each of said plurality of PCM signal samples;

storing the algebraic sum of said last mentioned signed magnitude (Real $V_f$) at the end of said time interval;

sequentially determining with said reference quantities the magnitude and sign of the imaginary part of said expression, $V_f$, (Imag. $V_f$) for each of said plurality of PCM signal samples; and storing the algebraic sum of said last mentioned signed magnitude (Imag. $V_f$) at the end of said time interval;

the magnitude of the complex number represented by said stored algebraic sums corresponding to Real $V_f$ and Imag. $V_f$ being proportional to the magnitude of said tone signal, $f_1$, present in said original analog signal.

2. The method of claim 1, wherein said storing of said algebraic sum corresponding to Real $V_f$ includes the steps of:

storing an initial Real $V_f$ determined for an initial sample of said PCM signal;

reading from storage said initial Real $V_f$;

determining a sub-total Real $V_f$ corresponding to the combination of said initial Real $V_f$ and a second Real $V_f$ determined for the next sample of said PCM signal;

storing said sub-total Real $V_f$;

repeating said steps during said time interval so that at the end thereof, the total Real $V_f$ for said PCM signal samples is stored.

3. The method of claim 2, wherein said storing of said algebraic sum corresponding to Imag. $V_f$ includes the steps of:

storing an initial Imag. $V_f$ determined for an initial sample of said PCM signal;

reading from storage said initial Imag. $V_f$;

determining a sub-total Imag. $V_f$ corresponding to said initial Imag. $V_f$ and a second Imag. $V_f$ determined for the next sample of said PCM signal;

storing said sub-total Imag. $V_f$;

repeating said steps during said time interval so that at the end thereof, the total Imag. $V_f$ for said PCM samples is stored.

4. The method of claim 1, including, sequentially determining from said PCM signal, a quantity, $V_r$, proportional to the amplitude of said analog signal, $V_a$, and storing said quantity, $V_r$.

5. The method of claim 4, including comparing the stored quantity, $V_r$, to said magnitude (Real $V_f$) to determine the presence of a tone signal.

6. The method of claim 4, including comparing the stored quantity, $V_r$, to said magnitude (Imag. $V_f$) to determine the presence of a tone signal.

7. A PCM tone signal detector for detecting at least one tone signal, $f_1$, from a plurality of samples of a PCM signal, $V_b$, corresponding to an original analog signal, $V_a$, comprising:

means for evaluating said samples of said PCM signal, $V_b$ sequentially during a time interval $t = 1$ to $t = n$ using the expression:

$$V_f = \frac{1}{255} \cdot \sum_{t=1}^{n} S \cdot \{(1+m+m'+mm') \cdot 2^{c-c'} - (1+m') \cdot 2^{c'}] + jS''[(1+m+m''+mm'') \cdot 2^{c\cdot c''} - (1+m'') \cdot 2^{c''}]\}$$

where S is the sign of $V_a$;

$S'$ is the sign of cos $2\pi ft$;

$S''$ *is the sign of sin* $2\pi ft$;

$m$, $m'$ and $m''$ are fractions, and $c$, $c'$ and $c''$ are integers, such that $1 + 255 \cdot |V_a| = (1 + m) \cdot 2^c$ $\cos 2\pi ft = S' \cdot (1 + m')\ 2c'$, and $\sin 2\pi ft = S'' \cdot (1 + m'')\ 2c''$, said means including;

reference means for providing reference quantities $S'$, $S''$, $c'$, $c''$, $m'$ and $m''$ corresponding to said tone signal, $f_1$;

means responsive to said reference quantities for sequentially determining the magnitude and sign of the real part of said expression, $V_f$, (Real $V_f$) for each of said plurality of PCM signal samples;

first accumulator storage means for storing the algebraic sum of said last mentioned signed magnitude (Real $V_f$) at the end of said time interval;

means responsive to said reference quantities for sequentially determining the magnitude and sign of the imaginary part of said expression, $V_f$, (Imag. $V_f$) for each of said plurality of PCM signal samples, and second accumulator storage means for storing the algebraic sum of said last mentioned magnitude (Imag. $V_f$) at the end of said time interval;

the magnitude of the complex number represented by said stored algebraic sums in said first and second accumulator means corresponding respectively toReal $V_f$ and Imag. $V_f$ being proportional to the magnitude of said tone signal, $f_1$, present in said original analog signal.

8. A PCM signal detector as claimed in claim 7, wherein said means for storing the algebraic sum corresponding to Real $V_f$ comprises means for accumulating sub-total Real $V_f$ values including;

means for storing an initial sub-total Real $V_f$ determined for an initial sample of said PCM signal in said first accumulator means;

means for reading said initial Real $V_f$ from saie first accumulator means;

means for determining a sub-total Real $V_f$ corresponding to the combination of said initial Real $V_f$ and a second Real $V_f$ determined for the next sample of said PCM signal and providing a corresponding output;

selector means for selectively coupling said output to said first accumulator means for storing said sub-total Real $V_f$ in said first accumulator means.

9. A PCM signal detector as claimed in claim 8, wherein said means for storing the algebraic sum corresponding to Imag. $V_f$ comprises means for accumulating sub-total Imag. $V_f$ values including;

means for storing an initial sub-total Imag. $V_f$ determined for an initial sample of said PCM signal in said second accumulator means;

means for reading said initial Imag. $V_f$ from said second accumulator means;

means for determining a sub-total Imag. $V_f$ corresponding to the combination of said initial Imag. $V_f$ and a second Imag. $V_f$ determined for the next sample of said PCM signal and providing a corresponding output;

said selector means selectively coupling said output to said second accumulator means for storing subtotal Imag. $V_f$ in said second accumulator means.

10. A PCM signal detector as claimed in claim 9 for detecting one or more tone signals, $f_1$ to $f_n$, from a plurality of samples of said PCM signal, said detector further including, a plurality of said first and second accumulator means for respectively storing said sub-total and total Real $V_f$ and Imag. $V_f$ corresponding to each of said tone signals;

a plurality of said reference means for providing said reference quantities corresponding to each of said tone signals;

reference quantity selector means coupled to said reference means for respectively sequentially selecting each of said reference quantities; and timing control means coupled to said means responsive to said reference quantities and to said plurality of first and second accumulator means for sequentially determining Real $V_f$ and Imag. $V_f$ for each of said plurality of PCM signal samples and storing the respective algebraic sums in respective accumulator means, the magnitude of the complex number represented by said respective algebraic sums being proportional to the magnitudes of said respective tone signals present in said original analog signal.

11. A PCM signal detector as claimed in claim 7, including, means responsive to said PCM signal samples for sequentially determining a quantity, $V_r$, proportional to the amplitude of said analog signal, $V_a$, and third accumulator storage means for storing said quantity, $V_r$.

12. A PCM signal detector as claimed in claim 11, including comparator means for comparing said stored quantity, $V_r$, to said stored magnitude (Real $V_f$) to determine the presence of a tone signal.

13. A PCM signal detector as claimed in claim 11, including comparator means for comparing the stored quantity $V_r$ to said stored magnitude (Imag. $V_f$) to determine the presence of a tone signal.

14. A PCM tone signal detector as claimed in claim 7, including:

means for providing a reference quantity, $K$, associated with said expression corresponding to said tone signal, said reference quantity, $K$, being chosen according to the desired threshold of detection of said tone signal, $f_1$;

means for measuring the strength of said original analog signal, $V_a$, using the expression:

$$V_r = K \cdot \sum_{t=1}^{n} |V_a|$$

said means including;

means receiving said reference quantity, $K$, and said PCM signal samples for sequentially determining the magnitude of $V_r$ for each of said samples;

means for sequentially storing and totalling said magnitude of $V_r$ over said time interval, and means for comparing the magnitude of the real and imaginary parts of said quantity $V_f$ to the magnitude of said quantity, $V_r$, said tone, $f_1$, being deemed present if and only if either or both of said magnitudes of said real and imaginary parts of $V_f$ exceed said magnitude of $V_r$.

* * * * *